United States Patent Office 3,093,786
Patented June 11, 1963

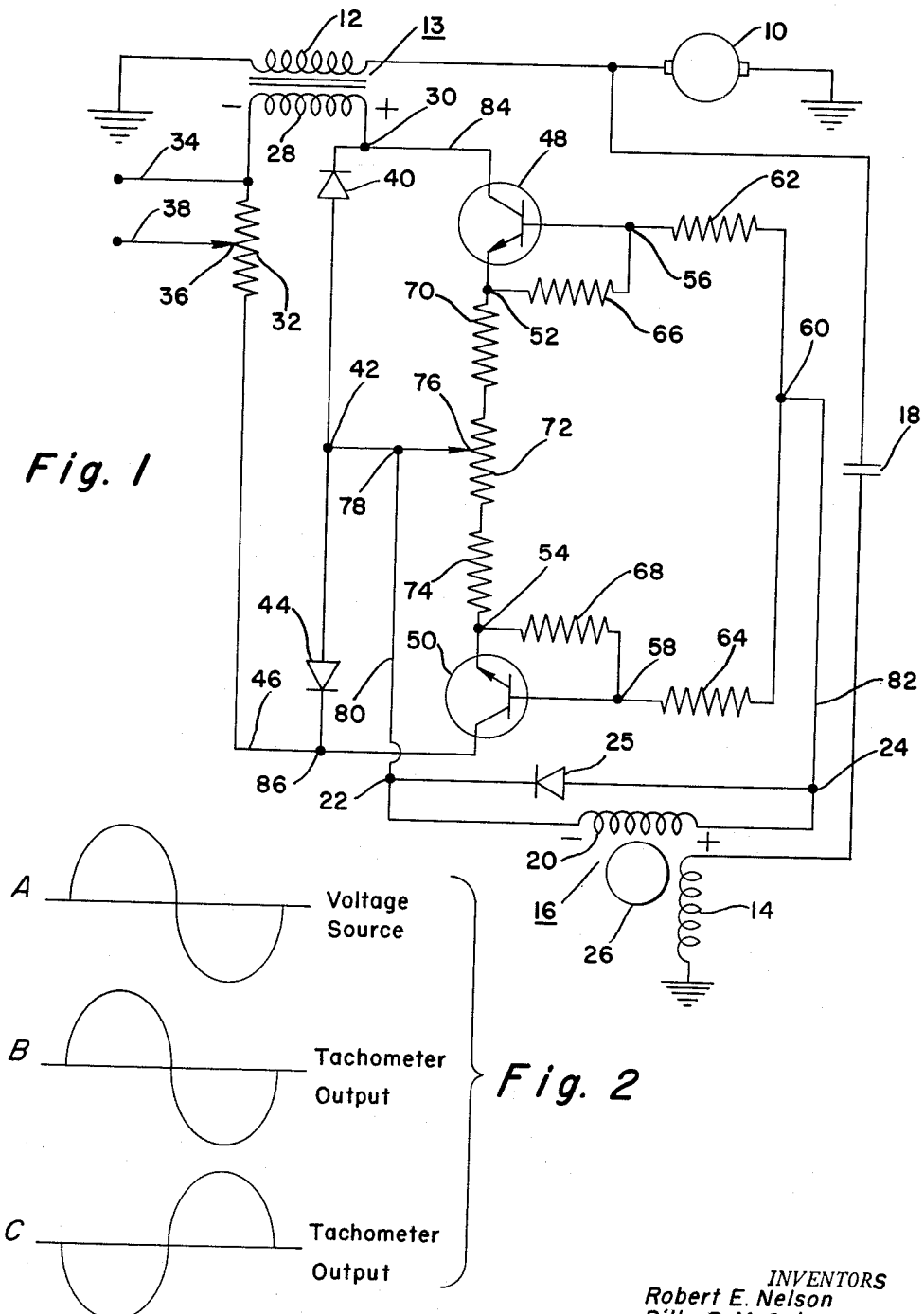

3,093,786
PHASE RESPONSIVE CONVERTER
Robert E. Nelson, Billy B. McCain, and Leo F. Welsh, Indianapolis, Ind., assignors to General Motors Corporation, Detroit, Mich., a corporation of Delaware
Filed May 23, 1960, Ser. No. 30,949
13 Claims. (Cl. 321—47)

This invention relates to an electric circuit for providing reversible polarity direct current from a source of A.C. voltage under the control of another A.C. voltage source having two outputs that are out of phase with one another.

One of the objects of this invention is to provide an electric circuit having a reversible polarity direct current output that includes a pair of rectifiers connected with an A.C. source and a pair of electronic switch means that take the form of transistors for controlling the condition of circuits that include the rectifiers, and, further, wherein the electronic switch means is controlled by an A.C. source having outputs that are out of phase with one another.

Another object of this invention is to provide an electric circuit having a reversible polarity direct current output that includes a pair of rectifiers connected with an A.C. source and a pair of transistors for controlling the conduction of circuits that include the rectifiers, and, further, wherein the conduction of the transistors is controlled by the output of a tachometer generator.

Further objects and advantages of the present invention will be apparent from the following description, reference being had to the accompanying drawings wherein preferred embodiments of the present invention are clearly shown.

In the drawings:

FIGURE 1 is a schematic diagram of an electric circuit made in accordance with this invention.

FIGURE 2 are curves of the voltage source and the output of the tachometer generator under various conditions of operation of the circuit of FIGURE 1.

Referring now to the drawings and more particularly to FIGURE 1, the reference numeral 10 designates a source of A.C. voltage which may be, for example, a 400 cycle A.C. source. It can be seen that the source of voltage 10 is connected with the primary winding 12 of a transformer 13. The A.C. voltage source 10 is also connected with an input winding 14 of a tachometer generator which is generally designated by reference numeral 16. A condenser 18 is connected between the A.C. voltage source 10 and the input winding 14, the condenser serving to shift the phase 90° so that the voltage applied across input winding 14 is 90° out of phase with the voltage provided by the source 10.

The tachometer generator 16 has an output winding 20 which is connected with junctions 22 and 24 and which is shunted by a diode 25. This generator is of the two-phase type, sometimes referred to as a drag cup or eddy current type commonly used in servo work. The generator, in addition to the windings 14 and 20, has a rotor 26. The output voltage of the tachometer generator which appears across junctions 22 and 24 is 90° out of phase with the voltage applied to the input winding 14. The output voltage appearing across junctions 22 and 24 has its phase shifted in response to a reversal in rotation of the rotor 26. It will be apparent, therefore, that in one direction of rotation of the rotor 26, the output voltage appearing across leads 22 and 24 will be in phase with the voltage of generator 10. This is true because the condenser 18 shifts the phase 90° and the tachometer generator further shifts it 90° so that its output voltage in one direction of the rotation of the rotor 26 is in phase with the output voltage of the generator 10. This phase relationship is depicted in FIGURE 2 wherein the curve A designates the output voltage of the generator 10 whereas curves B and C respectively illustrate the output voltage appearing across junctions 22 and 24 for different directions of rotation of the rotor 26.

The transformer 13 has a secondary winding 28 which is connected respectively with a junction 30 and to one side of a load resistor 32. The load resistor has one side thereof connected with a lead wire 34 and has shiftable tap point 36 connected with the lead wire 38. The lead wires 34 and 38 provide the direct current output of this circuit and, as will become more readily apparent hereinafter, the polarity of this direct current output will reverse depending upon the direction of rotation of the rotor 26 of tachometer generator 16. The junction 30 is connected with a rectifier 40 and it is seen that the opposite side of this rectifier is connected with junction 42. A second rectifier 44 is connected between junction 42 and a lead wire 46 which is, in turn, connected to one side of the load resistor 32.

The circuit of this invention includes a pair of npn transistors designated respectively by reference numerals 48 and 50. It can be seen that the emitter electrode of transistor 48 is connected with the junction 52 whereas the emitter electrode of transistor 50 is connected with junction 54. The base electrode of transistor 48 is connected with junction 56 whereas the base electrode of transistor 50 is connected with junction 58. The junctions 56 and 58 are connected with junction 60 through resistors 62 and 64. The junctions 52 and 56 are connected by a resistor 66 whereas the junctions 54 and 58 are connected by a resistor 68. It can be seen that resistors 66 and 68 are connected across the base and emitter electrodes of a respective transistor.

The junctions 52 and 54 are connected by a network including resistors 70, 72 and 74. The resistor 72 has a shiftable tap 76 which is connected with junctions 42 and 78. It is seen that the junction 78 is connected with junction 22 via lead wire 80 and that the junction 60 is connected with junction 24 via the lead wire 82.

The collector electrode of transistor 48 is connected with junction 30 via lead wire 84 whereas the collector electrode of transistor 50 is connected with the junction 86.

In the operation of this circuit, if there is no output from the tachometer generator 16, the transistors 48 and 50 will not conduct between their collector and emitter circuits so that no voltage will be developed across the resistor 32 and there, therefore, is no output voltage from the system.

If it is assumed that the polarity of the secondary winding 28 is as indicated in FIGURE 1 and that the polarity of tachometer is as indicated in FIGURE 1, there will be a voltage output developed across resistor 32. Under such a condition of operation, the voltage appearing across secondary winding 28 is depicted by the curve A in FIGURE 2 whereas the voltage appearing across junctions 22 and 24 from the tachometer generator is depicted by the curve B in FIGURE 2. The transistors 48 and 50 now will both be conductive during the first half cycle of applied voltage from the tachometer generator. With transistors 48 and 50 both conductive between their collectors and emitters, current will flow from secondary winding 28, through lead wire 84, through the collector and emitter circuit of transistor 48, through resistor 70 and a portion of resistor 72, through injection 78 to junction 42, through rectifier 44 to lead wire 46 and through the resistor 32 back to the other side of secondary winding 28. Current will not flow through resistor 50 under this condition of operation since the transistor 50 will effectively block such current flow.

If the rotation of rotor 26 of the tachometer generator is now reversed, the tachometer generator will produce an output voltage which is depicted by curve C in FIGURE 2. With this sort of energization, the transistors 48 and 50 will be nonconductive during the first half cycle of the output of the tachometer generator. On the last half cycle of this ouput voltage, both transistors 48 and 50 will be rendered conductive but the polarity across secondary winding 28 will be reversed from the polarity indicated in FIGURE 1 and current will flow through the load resistor 32 on the last half cycle of the voltage appearing across secondary winding 28. This current flow will be from the secondary winding 28, through load resistor 32, through lead wire 46, through the collector and emitter path of transistor 50, through resistor 74 and a portion of resistor 72, through junctions 78 and 42, through the rectifier 40 and thence back to the opposite side of the secondary winding 28 via the junction 30. It can be seen that the polarity of the voltage developed across 32 is now reversed from the condition wherein the rectifier 44 was conducting current. It also can be seen that, by providing two outputs from the tachometer generator which are out of phase with one another, the polarity of voltage appearing across resistor 32 may be controlled. The voltage appearing across resistor 32 will also be controlled as to magnitude since the output of the tachometer generator is proportional to the speed of rotation of the rotor 26 and this voltage will vary the conduction of transistors 48 and 50 to thus vary the amount of current flowing through the load resistor 32. It thus can be seen that a circuit has been provided which controls both the magnitude and polarity of the voltage appearing across resistor 32 in response to the phase relationship between the output voltage of tachometer generator 16 and the voltage appearing across secondary winding 28.

The purpose of diode 25 is to limit back voltage to a degree not sufficient to injure the transistors of the system. The resistors 66 and 68 provide offset bias for the transistors whereas the resistors 70, 72 and 74 provide negative feedback, thus making the output of the circuit linear.

While the embodiment of the present invention as hereindisclosed constitute preferred forms, it is to be understood that other forms might be adopted.

What is claimed is as follows:

1. An electric circuit providing a reversible direct current output, comprising, a source of A.C. voltage, a load, means forming a first loop circuit including said source of voltage, said load and a pair of rectifiers having sides of common polarity connected to a common junction, first and second transistors each having emitter, base and collector electrodes, a resistive network connecting the emitter electrodes of said transistors, means connecting the junction of said rectifiers with said resistive network, means connecting the collector electrodes of said transistors with the side of said rectifiers opposite from said common junction, a source of A.C. signal voltage, means connecting one side of said source of A.C. signal voltage with said common junction, and means connecting the opposite side of said source of A.C. signal voltage with the base electrodes of said transistors.

2. An electric circuit providing a reversible direct current output, comprising, a source of A.C. voltage, an electrical load, means forming a first loop circuit including said source of voltage, said load and a pair of rectifiers having sides of common polarity connected to a common junction, first and second transistors each having emitter, base and collector electrodes, means connecting the emitter electrodes of said transistors with said common junction, means connecting the collector electrodes of said transistors with the side of said rectifiers opposite from said common junction, a source of A.C. signal voltage, means connecting one side of said source of A.C. signal voltage with said common junction, and means connecting the opposite side of said source of A.C. signal voltage with the base electrodes of said transistors.

3. An electrical circuit for providing a reversible direct current output to a load comprising, a source of A.C. voltage, a direct current load, first and second transistors each having emitter, base and collector electrodes, a first circuit for energizing said electrical load including said voltage source, the emitter-collector circuit of said first transistor and a first diode, a second circuit for energizing said electrical load including said voltage source, the emitter-collector circuit of said second transistor and a second diode, said first diode being connected across the emitter-collector circuit of said second transistor to shunt the emitter-collector circuit of said second transistor when current is flowing through said first circuit, said second diode being connected across the emitter-collector circuit of said first transistor to shunt the emitter-collector circuit of said first transistor when current is flowing through said second circuit, and bias voltage means connected across the emitter and base electrodes of said transistors.

4. The system according to claim 3 wherein the bias voltage means is a second source of A.C. voltage.

5. An electric circuit for providing a reversible direct current output to a load comprising, a source of A.C. voltage, a direct current load, first and second diodes, a series loop circuit comprising, said source of A.C. voltage, said load and said diodes, said diodes having sides of common polarity connected together whereby they prevent current flow in said series loop circuit, first and second transistors each having emitter, base and collector electrodes, means connecting the emitter-collector circuit of said first transistor in series with said first diode and in shunt with said second diode, means connecting the emitter-collector circuit of said second transistor in series with said second diode and in shunt with said first diode, and means connected across the emitter and base electrodes of said transistors for controlling their conductivity.

6. The electric circuit according to claim 1 wherein means are provided for causing the A.C. signal voltage to be in or out of phase with the source of A.C. voltage.

7. The electric circuit according to claim 2 wherein the source of A.C. signal voltage comprises a tachometer generator having an input winding connected with the source of A.C. voltage.

8. The electric circuit according to claim 2 wherein the source of A.C. signal voltage is a tachometer generator having an input winding connected with the source of A.C. voltage through a capacitor.

9. An electric circuit for providing a reversible direct current output to a load comprising, a source of A.C. voltage, a direct current load, first and second control devices each having a pair of current carrying terminals and a control terminal, the conduction of each control device between its current carrying terminals being a function of the voltage applied between its control terminal and one of its current carrying terminals, a first circuit for energizing said electrical load including said voltage source, the current carrying terminals of said first control device and a first diode, a second circuit for energizing said electrical load including said voltage source, the current carrying terminals of said second control device and a second diode, said first diode being connected across the current carrying terminals of said second control device to shunt the current carrying terminals of said second control device when current is flowing through said first circuit, said second diode being connected across the current carrying terminals of said first control device to shunt the current carrying terminals of said first control device when current is flowing through said second circuit, and bias voltage means connected across the control terminal and one of the current carrying terminals of said control devices.

10. The electric circuit according to claim 9 wherein the control devices are three terminal semiconductors.

11. An electric circuit providing a reversible direct current output comprising, a source of A.C. voltage, an electrical load, means forming a first loop circuit including a source of voltage said load and a pair of rectifiers having sides of common polarity connected to a common junction, first and second three-terminal semiconductors each having a pair of current carrying terminals and a control terminal, means connecting like current carrying terminals of said semiconductors with said common junction, means connecting the other current carrying terminals of said semiconductors with the side of said rectifiers opposite from said common junction, a source of A.C. signal voltage, means connecting one side of said source of A.C. signal voltage with said common junction, and means connecting the opposite side of said source of A.C. signal voltage with the control terminals of said semiconductors.

12. The electric circuit according to claim 11 wherein the source of A.C. signal voltage is a tachometer generator which has an input winding energized from said source of A.C. voltage.

13. The electric circuit according to claim 11 wherein means are provided for causing the A.C. signal voltage to be in or out of phase with said source of A.C. voltage.

References Cited in the file of this patent
UNITED STATES PATENTS

| | | |
|---|---|---|
| 2,559,158 | Hornfeck | July 3, 1951 |
| 2,888,622 | Mooers | May 26, 1959 |

OTHER REFERENCES

"Motor Control Circuit," by F. K. Allen; published in IBM Technical Disclosure Bulletin, vol. 2, No. 5; February 1960, pp. 51 and 52.